(12) United States Patent
Suzuki (10) Patent No.: US 7,859,206 B2
(45) Date of Patent: Dec. 28, 2010

(54) MOTOR CONTROLLER AND ELECTRIC POWER STEERING APPARATUS

(75) Inventor: Hiroshi Suzuki, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 301 days.

(21) Appl. No.: 12/036,670

(22) Filed: Feb. 25, 2008

(65) Prior Publication Data
US 2008/0203963 A1    Aug. 28, 2008

(30) Foreign Application Priority Data
Feb. 26, 2007    (JP) .............................. 2007-046105

(51) Int. Cl.
*H02P 21/00*    (2006.01)

(52) U.S. Cl. .................. 318/400.02; 318/799; 318/800; 318/437

(58) Field of Classification Search ................. 318/628, 318/700, 400.02, 400.14, 400.21, 400.23, 318/400.26, 400.35, 727, 430, 432, 437, 318/799, 811; 180/271, 412, 443, 447
See application file for complete search history.

(56) References Cited

U.S. PATENT DOCUMENTS

| | | | |
|---|---|---|---|
| 4,251,846 A | | 2/1981 | Pearson et al. |
| 4,697,130 A | | 9/1987 | Dadpey et al. |
| 5,365,153 A | | 11/1994 | Fujita et al. |
| 5,488,281 A | | 1/1996 | Unsworth et al. |
| 5,614,803 A | | 3/1997 | Morioka et al. |
| 5,689,170 A | | 11/1997 | Ishikawa |
| 5,752,209 A | | 5/1998 | Nishimoto et al. |
| 6,037,741 A | | 3/2000 | Yamada et al. |
| 6,130,494 A | * | 10/2000 | Schob ........................ 310/90.5 |

(Continued)

FOREIGN PATENT DOCUMENTS

EP    0 691 730    1/1996

(Continued)

OTHER PUBLICATIONS

U.S. Appl. No. 12/024,647, filed Feb. 1, 2008, Suzuki.

(Continued)

*Primary Examiner*—Walter Benson
*Assistant Examiner*—Antony M Paul
(74) *Attorney, Agent, or Firm*—Oblon, Spivak, McClelland, Maier & Neustadt, L.L.P.

(57) ABSTRACT

A microcomputer includes a calculating section calculating a d-axis electric current command value and a q-axis electric current command value and a signal generating section. The signal generating section generates a motor control signal through feedback control in a d-q coordinate system based on the d-axis electric current command value and the q-axis electric current command value. The microcomputer also has an anomaly determining section, which detects an anomaly if a failure of electric current flow has occurred in any one of phases of a motor. If the anomaly is detected, the microcomputer produces a motor control signal instructing to use, as electric current flowing phases, two phases other than the phase with the failed electric current flow. At this stage, the microcomputer calculates the d-axis electric current command value in such a manner as to produce the q-axis electric current value corresponding to the q-axis electric current command value except for values at angles corresponding to the phase with the failed electric current flow.

10 Claims, 6 Drawing Sheets

U.S. PATENT DOCUMENTS

| | | | |
|---|---|---|---|
| 6,297,574 B1 * | 10/2001 | Schob et al. | 310/90.5 |
| 6,456,946 B1 | 9/2002 | O'Gorman | |
| 6,504,336 B2 * | 1/2003 | Sakamaki | 318/727 |
| 6,639,379 B2 | 10/2003 | Matsushita et al. | |
| 6,741,060 B2 | 5/2004 | Krefta et al. | |
| 6,927,548 B2 | 8/2005 | Nishizaki et al. | |
| 7,005,822 B1 | 2/2006 | O'Gorman et al. | |
| 7,084,601 B2 | 8/2006 | Maeda et al. | |
| 7,091,684 B2 * | 8/2006 | Kobayashi et al. | 318/432 |
| 7,141,948 B2 * | 11/2006 | Kifuku et al. | 318/432 |
| 7,161,317 B2 * | 1/2007 | Matsushita et al. | 318/432 |
| 7,161,323 B2 | 1/2007 | Ajima et al. | |
| 7,188,702 B2 | 3/2007 | Takagi et al. | |
| 7,193,388 B1 | 3/2007 | Skinner et al. | |
| 7,199,538 B2 * | 4/2007 | Kameya | 318/400.05 |
| 7,240,761 B2 | 7/2007 | Nagase et al. | |
| 7,298,109 B2 | 11/2007 | Sakamaki et al. | |
| 7,321,216 B2 | 1/2008 | Suzuki | |
| 7,348,756 B2 | 3/2008 | Ma et al. | |
| 7,394,214 B2 | 7/2008 | Endo et al. | |
| 7,414,425 B2 | 8/2008 | O'Gorman et al. | |
| 7,439,693 B2 | 10/2008 | Shoda et al. | |
| 7,459,879 B2 * | 12/2008 | Kezobo et al. | 318/803 |
| 7,474,067 B2 | 1/2009 | Ueda et al. | |
| 2002/0145837 A1 | 10/2002 | Krefta et al. | |
| 2006/0043917 A1 | 3/2006 | Kifuku et al. | |
| 2006/0076832 A1 | 4/2006 | Matsushita et al. | |
| 2008/0067960 A1 | 3/2008 | Maeda et al. | |
| 2009/0192665 A1 | 7/2009 | Nozawa | |

FOREIGN PATENT DOCUMENTS

| | | |
|---|---|---|
| JP | 2003-26020 | 1/2003 |

OTHER PUBLICATIONS

U.S. Appl. No. 12/036,614, filed Feb. 25, 2008, Suzuki.
U.S. Appl. No. 12/036,733, filed Feb. 25, 2008, Suzuki.
U.S. Appl. No. 12/128,304, filed May 28, 2008, Suzuki.
U.S. Appl. No. 12/139,054, filed Jun. 13, 2008, Suzuki.
U.S. Appl. No. 12/209,524, filed Sep. 12, 2008, Suzuki.
U.S. Appl. No. 12/212,165, filed Sep. 17, 2008, Suzuki.
Notice of Allowance dated May 25, 2010, in U.S. Appl. No. 12/036,733.
USPTO Notice of Allowance of Sep. 29, 2010, in U.S. Appl. No. 12/139,054, 9 pages.

* cited by examiner

MOTOR CONTROLLER AND ELECTRIC POWER STEERING APPARATUS

This application is based on and claims priority from Japanese Patent Application No. 2007-046105 filed on Feb. 26, 2007, the entire contents of which are incorporated herein by reference.

BACKGROUND OF THE INVENTION

The present invention relates to a motor controller and an electric power steering apparatus.

In many conventional cases, a motor controller used in an electric power steering apparatus (EPS) includes detecting means that detects an anomaly such as a failed electric current flow, which is caused in any one of U, V, and W phases of a motor by a break of a power supply cable or contact failure of a driver circuit. Normally, if an anomaly is detected, the controller quickly stops operation of the motor and thus performs fail-safe.

If an EPS, such stopping of the motor greatly changes steering characteristics. Specifically, an increased steering force is required for the driver to accurately carry out steering. In this regard, for example, Japanese Laid-Open Patent Publication No. 2003-26020 discloses a motor controller that continuously operates a motor using two phases other than a phase in which the electric current flow has failed as electric current flowing phases, regardless of detection of the phase with such failure. In this manner, assist force is continuously applied to a steering system so as to suppress increase of load on the driver caused by the fail safe.

Figure 9:
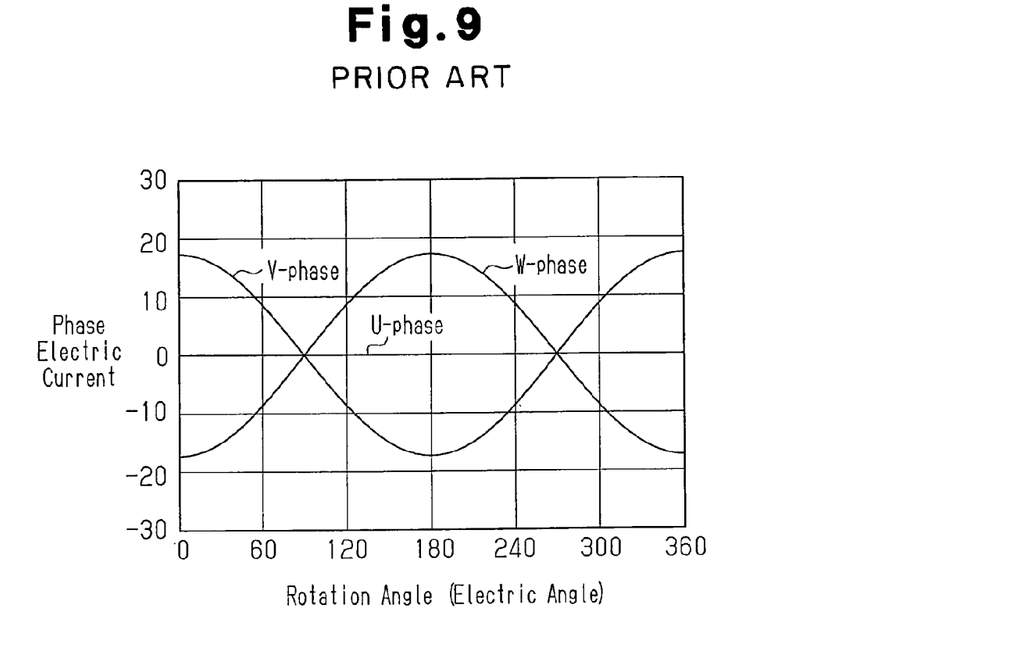
FIG. 9 is a graph representing a prior art two phase drive mode.

However, as in the conventional case, if the motor is continuously operated using the two phases other than the phase with a failed electric current flow as the electric current flowing phases after detection of the failure, a torque ripple may be caused and aggravate the steering comfort in the case illustrated in FIG. 9, in which a sinusoidal wave electric current is supplied to respective electric current flowing phases (in the example of FIG. 9, electric current flow in the U phase is failed while electric current flows in the V and W phases are normal).

When used in an EPS, which requires improved silence, a motor is usually driven by a sinusoidal wave electric current supply. Specifically, in many cases, detected phase electric current values of respective phases are converted into d-axis and q-axis electric current values of a d/q coordinate system. Feedback control is then performed in the d/q coordinate system in order to generate and output a motor control signal in accordance with which a sinusoidal wave electric current is supplied.

Figure 10:
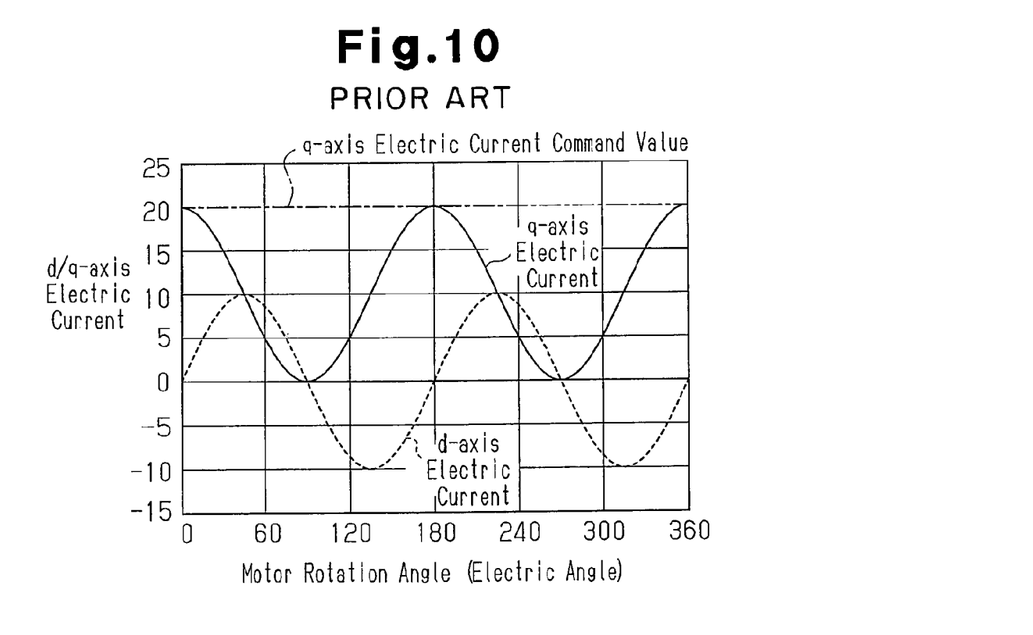
FIG. 10 is a graph representing changes of a d-axis electric current and a q-axis electric current in the prior art two phase drive mode.

However, under the operation with two phases as described above, the actual q-axis electric current value changes in a sinusoidal wave manner even with the q-axis electric current command value, or a target control value of motor torque, maintained constant, with reference to FIG. 10. In other words, the motor is continuously operated without exerting its output performance to a maximally possible extent.

SUMMARY OF THE INVENTION

Accordingly, it is an objective of the present invention to provide a motor controller and an electric power steering apparatus that suppress a torque ripple when an electric current flow fails in any phase.

To achieve the foregoing objective and in accordance with one aspect of the present invention, a motor controller having signal output means outputting a motor control signal and a driver circuit supplying a three phase drive power to a motor in response to the motor control signal is provided. The signal output means includes calculating means, signal generating means, and detecting means. The calculating means calculates, as electric current command values, a d-axis electric current command value and a q-axis electric current command value of a d/q coordinate system. The signal generating means generates the motor control signal by converting respective detected phase electric current values of the motor to a d-axis electric current value and a q-axis electric current value of the d/q coordinate system and performs feedback control in such a manner that the d-axis electric current value and the q-axis electric current value follow the calculated d-axis electric current value and the calculated q-axis electric current value, respectively. If a failure of electric current flow occurs in any one of phases of the motor, the detecting means is capable of detecting the anomaly. If the anomaly is detected, the signal output means outputs the motor control signal instructing to use, as electric current flowing phases, the phases other than the phase with the anomaly. When the anomaly is detected, the calculating means calculates the d-axis electric current command value in such a manner that a q-axis electric corresponding to the q-axis electric current command value is generated except for a rotation angle corresponding to the phase with the anomaly.

DETAILED DESCRIPTION OF THE PREFERRED EMBODIMENTS

An embodiment of the present invention, or an electric power steering apparatus (EPS), will now be described with reference to the attached drawings.

Figure 1:
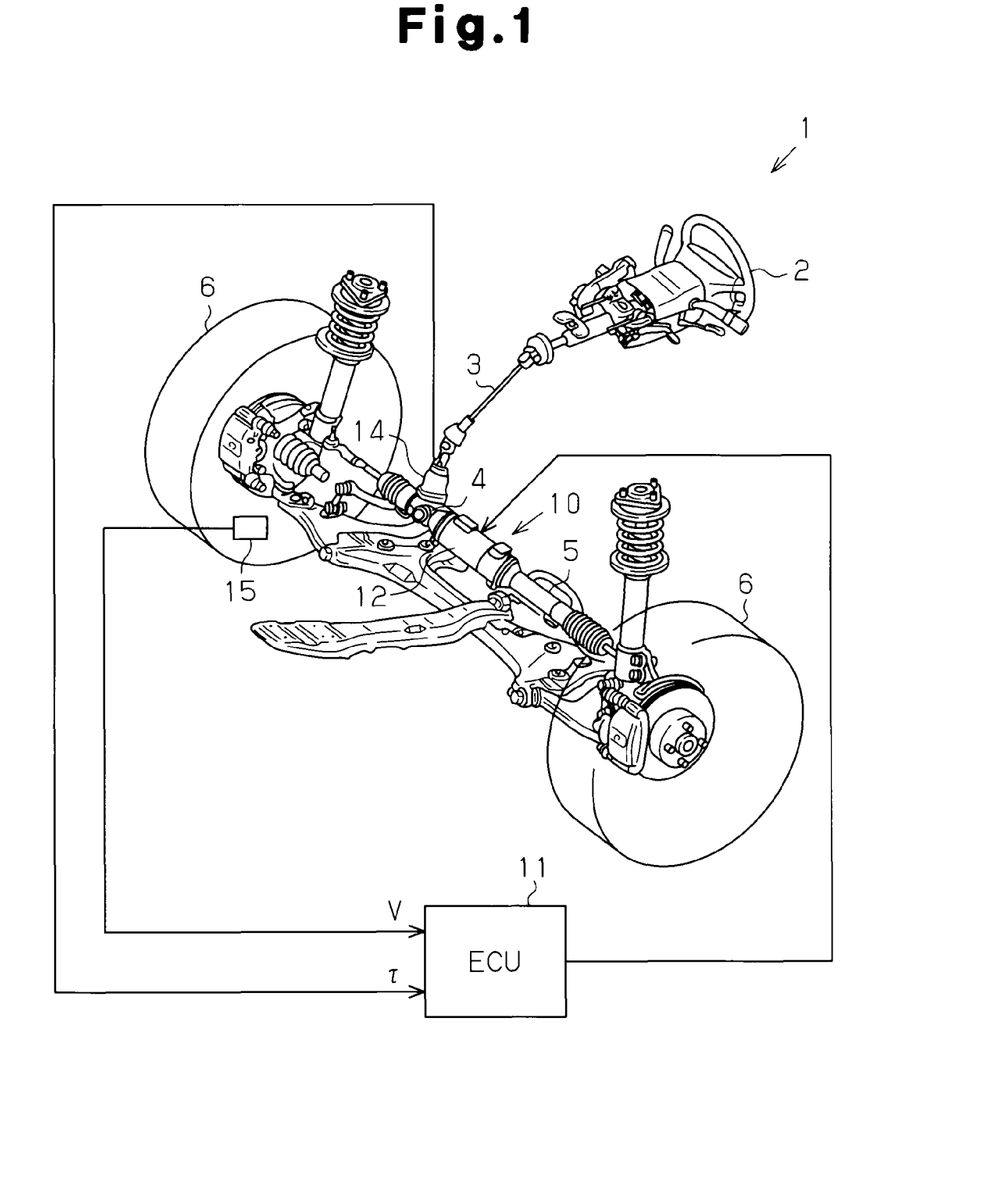
FIG. 1 is a schematic view showing an electric power steering apparatus.

As shown in FIG. 1, a steering wheel 2 is fixed to a steering shaft 3. The steering shaft 3 is connected to a rack 5 through a rack-and-pinion mechanism 4. Rotation of the steering shaft 3 in steering is converted into linear reciprocation of the rack 5 through the rack-and-pinion mechanism 4. As the rack 5 linearly reciprocates, steering angles of steerable wheels 6 change.

The EPS 1 includes an EPS actuator 10 and an ECU 11. The EPS actuator 10 is a steering force assisting device that applies assist force to a steering system to assist in steering. The ECU 11 is control means that controls operation of the EPS actuator 10.

The EPS actuator 10 is a rack type EPS actuator driven by a motor 12, which is arranged coaxially with the rack 5. In the EPS actuator 10, assist torque generated by the motor 12 is transmitted to the rack 5 through a ball screw mechanism (not shown). The motor 12 is a brushless motor and driven by three (U, V, W) phase drive power supplied by the ECU 11. The ECU 11 serving as a motor controller adjusts the assist torque produced by the motor 12 to regulate the assist force applied to the steering system (power assist control).

A torque sensor 14 and a vehicle speed sensor 15 are connected to the ECU 11. Based on steering torque $\tau$ and vehicle speed V, which are detected by the torque sensor 14 and the vehicle speed sensor 15, respectively, the ECU 11 controls operation of the EPS actuator 10, or performs the power assist control.

The electric configuration of the EPS 1 according to the illustrated embodiment will hereafter be explained.

Figure 2:
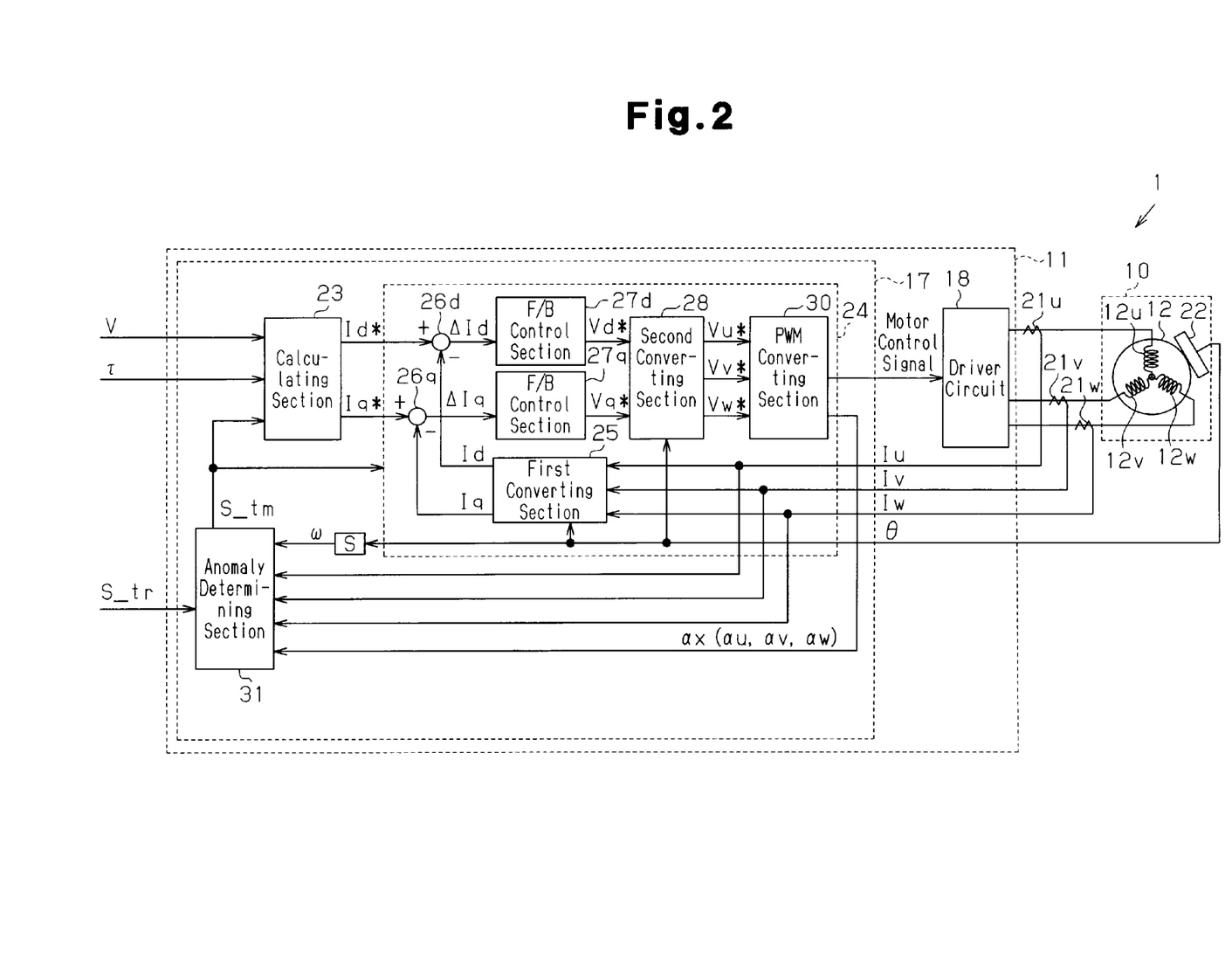
FIG. 2 is a block diagram representing the electric configuration of the electric power steering apparatus.

As illustrated in FIG. 2, the ECU 11 has a microcomputer 17 and a driver circuit 18. The microcomputer 17 is signal output means that outputs a motor control signal. The driver circuit 18 supplies the three phase drive power to the motor 12 in response to the motor control signal.

The driver circuit 18 is a publicly known PWM inverter that is configured by connecting three basic units (arms) corresponding to the respective phases in parallel. Each of the basic units is formed by a pair of switching elements that are connected in series. The motor control signal, which is output by the microcomputer 17, defines the ON-duty ratio of each of the switching elements, which form the driver circuit 18. When the motor control signal is provided to the gate terminal of each switching element, the switching element is turned selectively ON and OFF in response to the motor control signal. This converts DC voltage of a power source (not shown) mounted in the vehicle to the three (U, V, W) phase drive power. The drive power is then fed to the motor 12.

The ECU 11 is connected to electric current sensors 21$u$, 21$v$, and 21$w$, which detect phase electric current values Iu, Iv, and Iw supplied to the motor 12, respectively, and a rotation angle sensor 22 detecting a rotation angle $\theta$ of the motor 12. Based on the phase electric current values Iu, Iv, Iw and the rotation angle $\theta$ of the motor 12, which are detected by the corresponding sensors, and the steering torque $\tau$ and the vehicle speed V, the microcomputer 17 generates and outputs the motor control signal to the driver circuit 18.

The microcomputer 17 includes a calculating section 23 serving as calculating means and a signal generating section 24 serving as signal generating means. The calculating section 23 calculates an electric current command value as a target control value of the assist force applied to the steering system, or motor torque. The signal generating section 24 generates the motor control signal based on the electric current command value, which is provided by the calculating section 23.

The calculating section 23 calculates a d-axis electric current command value Id* and a q-axis electric current command value Iq* based on the steering torque $\tau$ and the vehicle speed V, which are detected by the torque sensor 14 and the vehicle speed sensor 15, respectively. The calculating section 23 then outputs the obtained d-axis electric current command value Id* and q-axis electric current command value Iq* to the signal generating section 24. Along with the d-axis electric current command value Id* and the q-axis electric current command value Iq*, which are provided by the calculating section 23, the signal generating section 24 receives the phase electric current values Iu, Iv, Iw detected by the corresponding electric current sensors 21$u$, 21$v$, 21$w$ and the rotation angle $\theta$ detected by the rotation angle sensor 22. Based on the phase electric current values Iu, Iv, Iw and the rotation angle $\theta$ (the electric angle), the signal generating section 24 generates the motor control signal by performing feedback control on electric currents in the d-q coordinate system. As is known publicly, the d/q coordinate system refers to a rotating coordinate system defined by a d axis, which is, for example, a direction proceeding from the S pole to the N pole of a rotor, and a q axis extending perpendicular to the d axis.

In the signal generating section 24, the phase electric current values Iu, Iv, Iw are input to a first converting section 25, or a three phase/two phase converting section, together with the rotation angle $\theta$. The first converting section 25 converts the phase electric current values Iu, Iv, Iw into the d-axis electric current value Id and the q-axis electric current value Iq of the d/q coordinate system. The q-axis electric current command value Iq*, which is output by the calculating section 23, is input to a subtractor 26$q$, together with the q-axis electric current value Iq. The d-axis electric current command value Id* is input to a subtractor 26$d$, together with the d-axis electric current value Id. In normal control, the calculating section 23 outputs "0" as the d-axis electric current command value Id* (Id*=0). The subtractor 26$d$ obtains a d-axis electric current deviation $\Delta$Id and the subtractor 26$q$ determines a q-axis electric current deviation $\Delta$Iq. The d-axis electric current deviation $\Delta$Id and the q-axis electric current deviation $\Delta$Iq are then input to corresponding F/B control sections 27$d$, 27$q$. The F/B control sections 27$d$, 27$q$ each carry out feedback control in such a manner that the d-axis electric current value Id and the q-axis electric current value Iq, which are actual electric current values, follow the d-axis electric current command value Id* and the q-axis electric current command value Iq*, respectively, which are provided by the calculating section 23.

Specifically, the F/B control section 27$d$ multiplies the d-axis electric current deviation $\Delta$Id by a predetermined F/B gain (PI gain), thus obtaining a d-axis voltage command value Vd*. The F/B control section 27$q$ multiplies the q-axis electric current deviation $\Delta$Iq by the F/B gain and thus determines a q-axis voltage command value Vq*. The d-axis voltage command value Vd* and the q-axis voltage command value Vq*, which are provided by the corresponding F/B control sections 27$d$, 27$q$, are input to a second converting section 28 serving as a two phase/three phase converting section, together with the rotation angle $\theta$. The second converting section 28 converts the d-axis voltage command value Vd* and the q-axis voltage command value Vq* to three phase voltage command values Vu*, Vv*, and Vw*.

The voltage command values Vu*, Vv*, Vw*, which are obtained by the second converting section 28, are input to a PWM converting section 30. The PWM converting section 30 generates duty command values $\alpha$u, $\alpha$v, and $\alpha$w based on the voltage command values Vu*, Vv*, and Vw*. The signal generating section 24 generates a motor control signal having an ON duty ratio corresponding to each of the duty command values $\alpha$u, $\alpha$v, $\alpha$w. The microcomputer 17 outputs the motor control signal to the gate terminal of each switching element of the driver circuit 18. The microcomputer 17 thus controls operation of the driver circuit 18, or drive power supply to the motor 12.

(Control for when Anomaly Occurs)

The ECU 11 of the illustrated embodiment operates in the following manner when an anomaly occurs.

With reference to FIG. 2, the microcomputer 17 has an anomaly determining section 31 that serves as detecting means and identifies the nature of an anomaly when any anomaly occurs in the EPS 1. The ECU 11 changes control modes of the motor 12 based on the nature of the anomaly identified by the anomaly determining section 31.

An anomaly signal S_tr, in accordance with which an anomaly is detected in the mechanical structure of the EPS actuator 10, is input to the anomaly determining section 31. In response to the anomaly signal S_tr, the anomaly determining section 31 detects an anomaly in the mechanical system of the EPS 1. Also, the phase electric current values Iu, Iv, Iw and the rotation angular velocity ω of the motor 12 and the duty command values αu, αv, αw of the respective phases are input to the anomaly determining section 31. Based on these condition amounts, the anomaly determining section 31 detects an anomaly of the torque sensor 14 or an anomaly of a power supply system for the motor 12, which is an overcurrent or a failure of electric current flow in any of the phases caused by a break of a power cable (including a motor coil) or a contact failure of the driver circuit 18.

If a phase electric current value Ix of X phase (X=U, V, or W) is smaller than or equal to a predetermined value Ith ($|Ix| \leq Ith$) and the rotation angular velocity ω falls in a target range of determination whether a break has occurred ($|\omega| \leq \omega 0$), failure of an electric current flow is detected in the phase depending on whether the duty command value αx corresponding to the phase is continuously maintained outside a predetermined range ($\alpha Lo \leq \alpha x \leq \alpha Hi$). The range is provided based on a predetermined value Ith that is a threshold value of the phase electric current value Ix and a threshold value ω0 of the rotation angular velocity ω that defines the determination target range.

In this case, the value Ith, or the threshold value of the phase electric current value Ix, is set to a value approximate to "0". The threshold value ω0 of the rotation angular velocity ω is set to the value corresponding to the base speed (the maximum number of rotation) of the motor 12. The threshold values (αLo, αHi) of the duty command value αx are set to a value smaller than a lower limit value of the duty command value αx and a value greater than an upper limit value, respectively, in the normal control.

Figure 3:
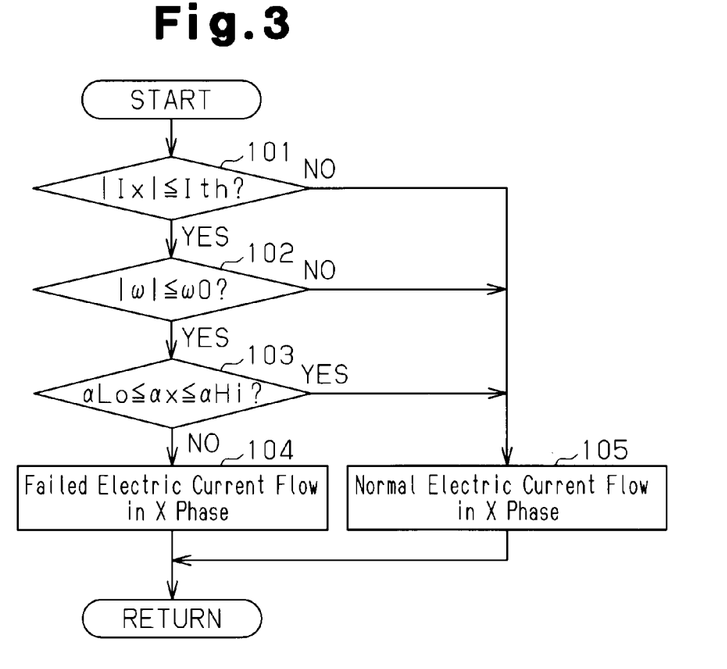
FIG. 3 is a flowchart representing a procedure for detecting a phase with a failed electric current flow.

With reference to the flowchart of FIG. 3, the anomaly determining section 31 determines whether the absolute value of the detected phase electric current value Ix is smaller than or equal to the value Ith (step 101). If the absolute value of the phase electric current value Ix is smaller than or equal to the value Ith ($|Ix| \leq Ith$, step 101: YES), the anomaly determining section 31 determines whether the absolute value of the rotation angular velocity ω is smaller than or equal to the predetermined threshold value ω0 (step 102). If the rotation angular velocity ω is smaller than or equal to the threshold value ω0 ($|\omega| \leq \omega 0$, step 102), the anomaly determining section 31 determines whether the duty command value αx falls in the predetermined range ($\alpha Lo \leq \alpha x \leq \alpha Hi$, step 103). If the duty command value αx is outside the predetermined range (step 103: NO), the anomaly determining section 31 determines a failure of electric current flow has occurred in the X phase (step 104).

Contrastingly, if the phase electric current value Ix is greater than the predetermined value Ith ($|Ix| > Ith$, step 101: NO), or the rotation angular velocity ω is greater than the threshold value ω0 ($|\omega| > \omega 0$, step 102: NO), or the duty command value αx is in the predetermined range ($\alpha Lo \leq \alpha x \leq \alpha Hi$, step 103: YES), the anomaly determining section 31 determines that the X phase is free from a failure of electric current flow (a normal electric current flow in the X phase, step 105).

If a failure of electric current flow occurs in the X phase, that is, any one of the U, V, and W phases, due to a break, for example, the phase electric current value Ix of the phase with the failed electric current flow becomes "0". Other than a break, the followings are two other possible cases in which the phase electric current value Ix of the X phase becomes "0" or a value approximate to "0".

The rotation angular velocity of the motor reaches the maximum number of rotation.

The electric current command value becomes substantially "0".

Thus, the anomaly determining section 31 first compares the phase electric current value Ix of the X phase, which is the object of determination, with the predetermined value Ith to determine whether the phase electric current value Ix is "0". The anomaly determining section 31 then determines whether the phase electric current value Ix is "0" or a value approximate to "0" due to a cause other than a break, which is any one of the above-listed cases. If the two cases are both ruled out, the anomaly determining section 31 determines that a break has occurred in the X phase.

If the duty command value αx reaches an extreme level without increase of the rotation angular velocity ω to the level at which the phase electric current value Ix becomes smaller or equal to the value Ith approximate to "0", the anomaly determining section 31 determines that a failure of electric current flow has occurred in the X phase. The anomaly determining section 31 carries out the above-described procedure of determination for the respective U, V, and W phases to identify the phase with the failed electric current flow.

Although it has been omitted from the flowchart of FIG. 3 for the illustrative purposes, the above-described determination is carried out only if the voltage of the power supply is greater than or equal to a specified voltage necessary to drive the motor 12. Final determination that an anomaly has been detected is made in step 104 depending on whether determination of the failed electric current flow is continuously maintained for a predetermined period or more.

Based on the result of determination by the anomaly determining section 31, the ECU 11 switches the control modes of the motor 12. Specifically, the anomaly determining section 31 outputs the result of the determination, including detection of the failure of electric current flow, to the calculating section 23 and the signal generating section 24, as an anomaly detection signal S_tm. The calculating section 23 and the signal generating section 24 calculate the d-axis electric current command value Id* and the q-axis electric current command value Iq* based on the anomaly detection signal S_tm and generate a motor control signal. This switches the control modes of the motor 12 operated by the microcomputer 17.

More specifically, the ECU 11 operates in accordance with three control modes, which are a "normal control mode" for a normal state, an "assist suspension mode" for when an anomaly has been caused and thus the motor 12 must be stopped, and a "two phase drive mode" for a state in which a failure of electric current flow has occurred in any one of the phases of the motor 12. If the anomaly detection signal S_tm provided by the anomaly determining section 31 corresponds to the "normal control mode", the calculating section 23 and the signal generating section 24 calculate the d-axis electric current command value Id* and the q-axis electric current command value Iq* for the normal state and generate the motor control signal.

If the anomaly detection signal S_tm of the anomaly determining section 31 corresponds to the "assist suspension mode", the calculating section 23 and the signal generating section 24 calculate the d-axis electric current command value Id* and the q-axis electric current command value Iq* and generate the motor control signal in such a manner as to stop the motor 12. The "assist suspension mode" is selected if an anomaly is caused in the mechanical system or the torque sensor 14 or an overcurrent, which is also an anomaly, is caused in the power supply system. Further, in accordance with the "assist suspension mode", the motor 12 may be stopped immediately or after the output of the motor 12, or the assist force, is gradually decreased. In the latter case, the signal generating section 24 gradually decreases the absolute value of the q-axis electric current command value Iq*, which is provided by the signal generating section 24. After stopping the motor 12, the microcomputer 17 switches the switching elements of the driver circuit 18 to open states and opens a non-illustrated power source relay.

The anomaly detection signal S_tm corresponding to the "two phase drive mode" carries information needed for identifying the phase in which the failure of electric current flow has occurred. If the anomaly detection signal S_tm provided by the anomaly determining section 31 corresponds to the "two phase drive mode", the signal generating section 24 generates the motor control signal that instructs to use the two phases other than the phase with the failed electric current flow as electric current flowing phases.

Figure 4:
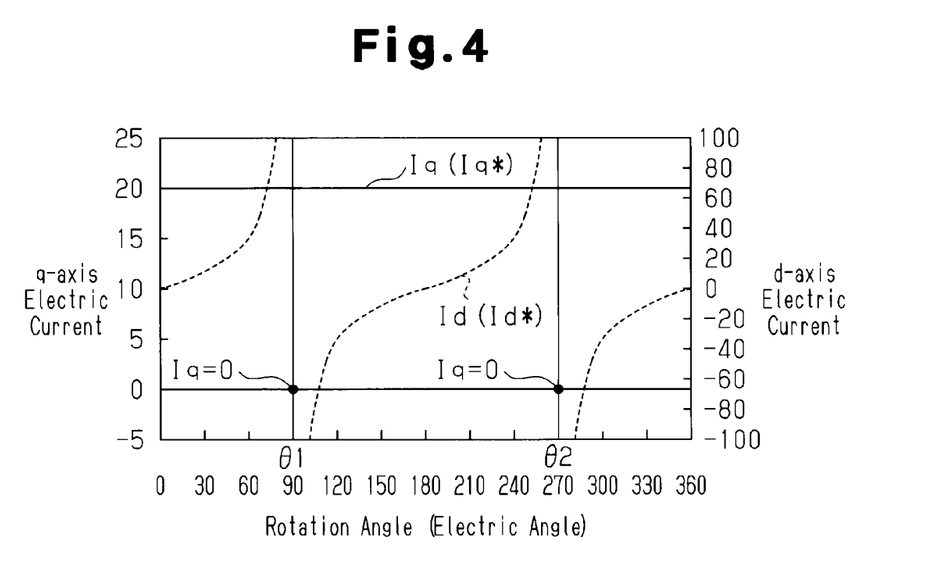
FIG. 4 is a graph representing changes of a d-axis electric current and a q-axis electric current in a two phase drive mode according to an embodiment of the present invention.

With reference to FIG. 4, in the "two phase drive mode", the calculating section 23 calculates the d-axis electric current command value Id* in such a manner as to produce the q-axis electric current value Iq corresponding to the q-axis electric current command value Iq*, excepting for rotation angles θ1, θ2 corresponding to the phase with the failed electric current flow. In the example illustrated in FIG. 4, the failure of electric current flow has occurred in the U phase and the rotation angle θ1 and the rotation angle θ2 are "90°" and "270°", respectively. If the failed electric current flow has occurred in the V phase, the rotation angle θ1 and the rotation angle θ2 are "30°" and "210°", respectively. If the failed electric current flow has occurred in the W phase, the rotation angle θ1 and the rotation angle θ2 are "150°" and "330°", respectively.

Specifically, the calculating section 23 calculates the d-axis electric current command value Id* in correspondence with the phase with the detected failure of electric current flow, or the phase with the failed electric current flow, using the following expressions (1), (2), and (3).

[Expression]

If the failure of electric current flow has occurred in the U phase:

$$I_d^* = I_q^* \times \tan\theta \qquad (1)$$

If the failure of electric current flow has occurred in the V phase:

$$I_d^* = I_q^* \times \tan\left(\theta - \frac{2\pi}{3}\right) \qquad (2)$$

If the failure of electric current flow has occurred in the W phase:

$$I_d^* = I_q^* \times \tan\left(\theta + \frac{2\pi}{3}\right) \qquad (3)$$

With reference to FIG. 4, the d-axis electric current command value Id* obtained from the expressions (1) to (3) changes in a monotonically nondecreasing manner (Iq*>0) or a monotonically nonincreasing manner (Iq*<0) based on the sign of the q-axis electric current command value Iq* with lines corresponding to the rotation angles θ1, θ2 serving as asymptotic lines, or, more specifically, varies in accordance with a tangent curve. The signal generating section 24 performs feedback control in the d/q coordinate system based on the d-axis electric current command value Id* (and the q-axis electric current command value Iq*) to cause the actual q-axis electric current value Iq to follow the q-axis electric current command value Iq*, except for the predetermined rotation angles.

Figure 5:
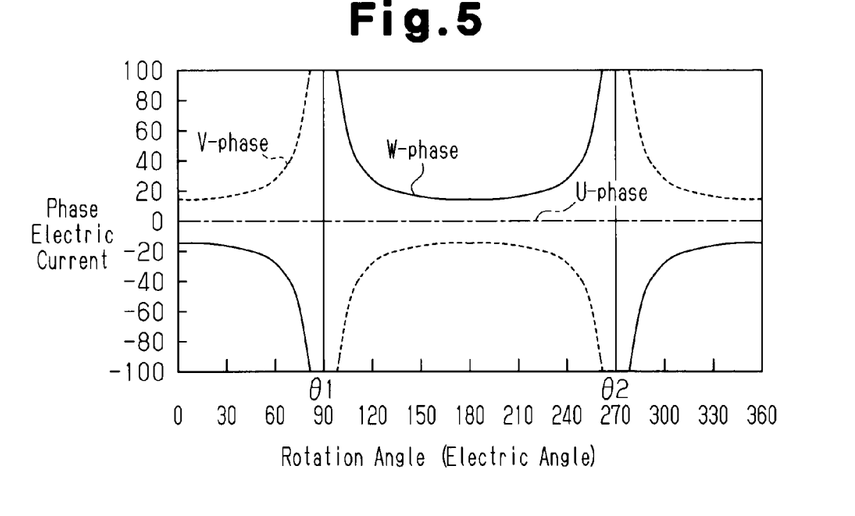
FIG. 5 is a graph representing changes of respective phase electric currents in the two phase drive mode according to the illustrated embodiment.

Specifically, the q-axis electric current value Iq becomes "0" at the predetermined rotation angles θ1, θ2. However, at the rotation angle θ of the motor 12 other than the rotation angles θ1, θ2, the q-axis electric value Iq corresponding to the target value, or the q-axis electric value command value Iq*, (the q-axis electric current value substantially equal to the q-axis electric current command value Iq*) is generated. In this state, the phase electric current values in the two electric current flowing phases (the V and W phases) change along secant curves with lines corresponding to the rotation angles θ1, θ2 as asymptotic lines (the phase electric current values are reciprocals of cos θ (secant: secθ)), with reference to FIG. 5. This suppresses a torque ripple when there is a phase with a failed electric current. Accordingly, while maintaining improved steering comfort, the assist force is continuously applied to the steering system.

A procedure performed by the microcomputer 17 to determine whether an anomaly has occurred and switch the control modes will now be described.

Figure 6:
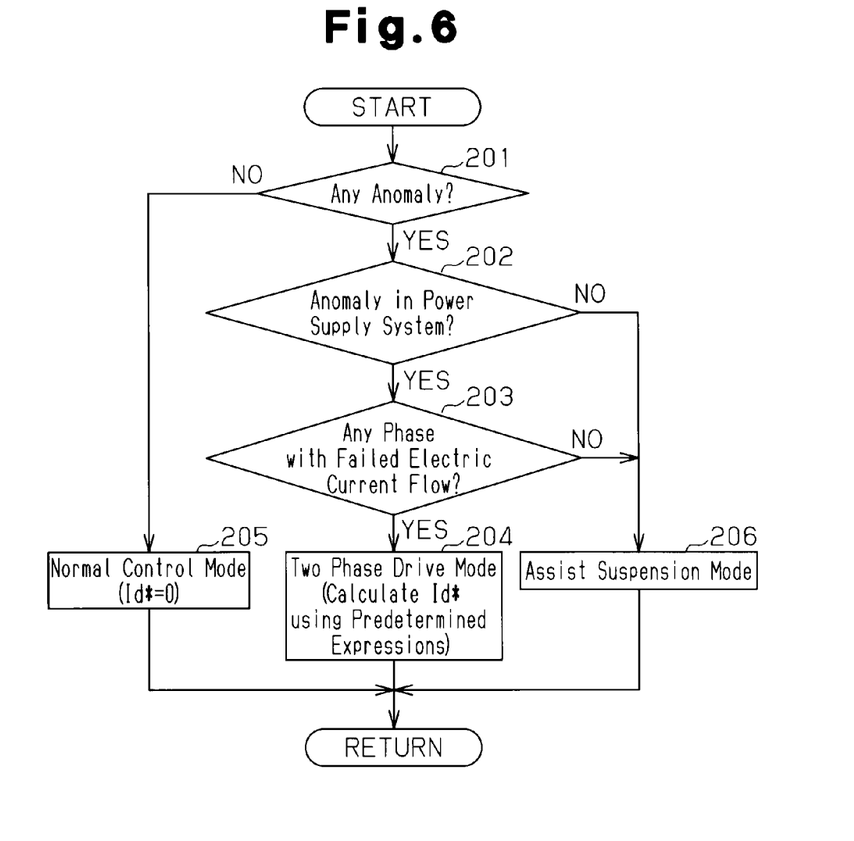
FIG. 6 is a flowchart representing a procedure for determining whether an anomaly has been caused and switching control modes.

As illustrated in the flowchart of FIG. 6, the microcomputer 17 first determines whether an anomaly has occurred (step 201). If it is determined that an anomaly has occurred (step 201: YES), the microcomputer 17 determines whether the anomaly has occurred in the power supply system (step 202). If it is determined that the anomaly has been brought about in the power supply system (step 202: YES), the microcomputer 17 determines whether the anomaly of the power supply system corresponds to a failure of electric current flow in any one of the phases (step 203). If it is determined that such failure of electric current flow has occurred in a certain phase (step 203: YES), the microcomputer 17 outputs the motor control signal instructing to use the other two of the phases free from a failure of electric current flow as the electric current flowing phases (the two phase drive mode, step 204). At this stage, the microcomputer 17 calculates the d-axis electric value command value Id* based on the phase with the failed electric current flow, in accordance with the expressions (1) to (3).

If it is determined that there is no anomaly in step 201 (step 201: NO), the microcomputer 17 provides a normal motor control signal (Id*=0, the normal control mode, step 205). If it is determined that the anomaly has occurred outside the power supply system (step 202: NO) or that the anomaly is other than the failure of electric current flow brought about in any one of the phases (step 203: NO), the microcomputer 17 switches the control mode to the assist suspension mode (in step 206). The microcomputer 17 then outputs the motor control signal instructing to stop the motor 12 and opens the power source relay.

The illustrated embodiment has the following advantages.

(1) The microcomputer 17 has the calculating section 23 and the signal generating section 24. The calculating section 23 calculates the d-axis electric current command value Id* and the q-axis electric current command value Iq*. The signal generating section 24 carries out feedback control in the d-q coordinate system based on the d-axis electric current command value Id* and the q-axis electric current command value Iq*, thereby generating the motor control signal. The microcomputer 17 also has the anomaly determining section 31, which detects an anomaly when a failure of electric current flow has occurred in any one of the phases. If the anomaly is detected, the microcomputer 17 generates the motor control signal that instructs to use the two phases other than the phase with the failed electric current flow as the electric current flowing phases. At this stage, the microcomputer 17 calculates the d-axis electric current command value Id* in such a manner that the q-axis electric current value Iq corresponding to the q-axis electric current command value Iq* is generated except for rotation angles corresponding to the phase with the failed electric current supply.

In this manner, a torque ripple is prevented from occurring even if a failure of electric current flow has occurred in any one of the phases. As a result, while maintaining the improved steering comfort, the assist force is continuously applied to the steering system.

The illustrated embodiment may be modified as follows.

The present invention may be embodied as a motor controller used for purposes other than use in an electric power steering apparatus (an EPS).

In the illustrated embodiment, the ECU 11 operates in the three control modes, which are the "normal control mode", the "assist suspension mode", and the "two phase drive mode". However, when an anomaly is detected, the motor 12 may be operated in any suitable operating modes other than the three modes. In other words, the ECU 11 may operate in any other suitable modes as long as the motor 12 is operated with the two phases other than the phase with the failed electric current as the electric current flowing phases when an anomaly is detected. Also, the method for detecting an anomaly is not restricted to the method of the illustrated embodiment.

In the illustrated embodiment, in the two phase drive mode, the calculating section 23 calculates the d-axis electric current command value Id* in correspondence with the phase with the detected failure of electric current flow (the phase having the failed electric current flow), using the expressions (1) to (3). However, as long as the obtained d-axis electric current command value Id* changes in a monotonically nondecreasing manner (Iq*>0) or a monotonically nonincreasing manner (Iq*<0) in correspondence with the sign of the q-axis electric current command value Iq* with lines corresponding to the predetermined rotation angles θ1, θ2 as the asymptotic lines, any suitable expressions may be employed. Alternatively, by the d-axis electric current command value Id* that changes along a tangential curve with lines corresponding to the rotation angles θ1, θ2 as the asymptotic lines, the q-axis electric current value Iq corresponding to the q-axis electric current command value Iq* is obtained to a certain extent. However, if the d-axis electric current command value Id* is calculated using the expressions (1) to (3), the generated q-axis electric current value Iq maximally approximates to the q-axis electric current command value Iq*. The more approximate the value obtained by the method is to the d-axis electric current command value Id* obtained from the expressions, the more effective the method.

Also, in the above-described two phase drive mode, the calculating section 23 may perform a guard procedure so that the absolute value of the d-axis electric current command value Id*, which is output by the calculating section 23, is limited to a predetermined range. Specifically, the d-axis electric current command value Id* may be restricted to the range represented by the following expression (4).

[Expression] (4)

$$-\sqrt{\frac{3}{2}I_{x\,max}^2 - I_q^*} \leq I_d^* \leq \sqrt{\frac{3}{2}I_{x\,max}^2 - I_q^*}$$

In the expression (4), the value "Ix_max" is the upper limit of the electric current that can be supplied to the X phase (the U, V, or W phase). The upper limit is determined in accordance with the rated current or the like of each switching element of the driver circuit 18. The expression (4) is related to the condition that should be met by the d-axis electric current command value Id* to generate the q-axis electric current value Iq (the q-axis electric current command value Iq*) under restriction of such upper limit.

Figure 7:
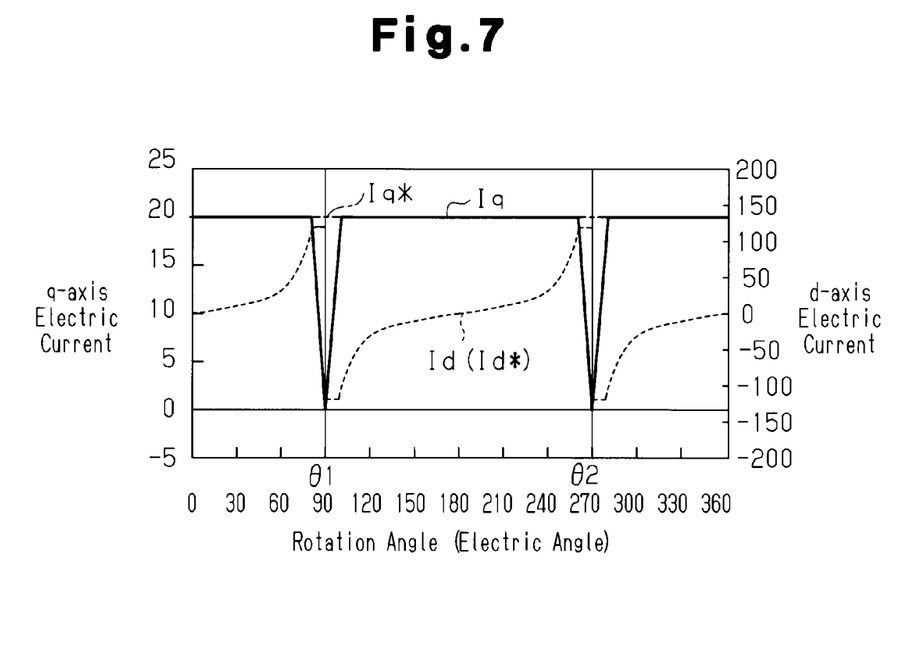
FIG. 7 is a graph representing changes of a d-axis electric current and a q-axis electric current in a two-phase drive mode according to a modified embodiment.
Figure 8:
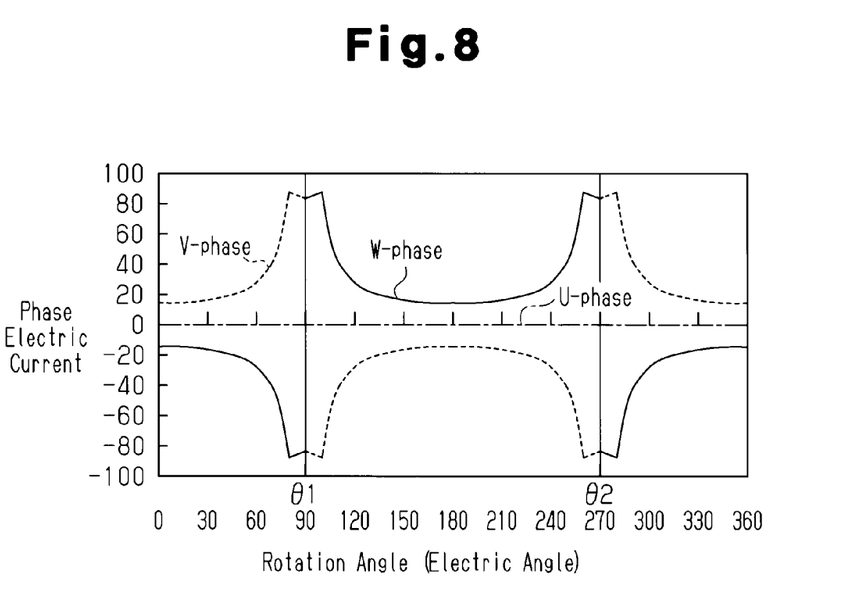
FIG. 8 is a graph representing changes of respective phase electric currents in the two phase drive mode of the modified embodiment.

Specifically, in many cases, there is the upper limit for the absolute value of the electric current that can flow in each of the phases. A flow of electric current exceeding the upper limit in any one of the phases may heat the switching elements of the driver circuit 18 and the motor coil 12u, 12v, 12w of the phase. However, according to the above-described guard procedure, although the q-axis electric current value Iq corresponding to the q-axis electric current command value Iq* cannot be generated in some ranges of the rotation angles approximate to the rotation angles θ1, θ2, as illustrated in FIG. 7, the electric current values of the two phases (the V and W phases) as the electric current flowing phases are prevented from increasing to an extreme extent in these ranges, with reference to FIG. 8 (see FIGS. 4 and 5). As a result, the motor 12 is operated further stably even if a failure of electric current flow occurs in any one of the phases.

The invention claimed is:

1. A motor controller having signal output means outputting a motor control signal and a driver circuit supplying a three phase drive power to a motor in response to the motor control signal, wherein the signal output means includes:

calculating means calculating, as electric current command values, a d-axis electric current command value and a q-axis electric current command value of a d/q coordinate system;

signal generating means generating the motor control signal by converting respective detected phase electric current values of the motor to a d-axis electric current value and a q-axis electric current value of the d/q coordinate system and performing feedback control in such a manner that the d-axis electric current value and the q-axis electric current value follow the calculated d-axis electric current command value and the calculated q-axis electric current command value, respectively; and detecting means, wherein, if a failure of electric current flow occurs in any one of phases of the motor, the detecting means is capable of detecting the anomaly, wherein, if the anomaly is detected, the signal output means outputs the motor control signal instructing to use, as electric current flowing phases, the phases other than the phase with the anomaly, and wherein, when the anomaly is detected, the calculating means calculates the d-axis electric current command value in such a manner that a q-axis electric value corresponding to the q-axis electric current command value is generated, except that the q-axis electric value does not correspond to the q-axis electric current command value for a rotation angle corresponding to the phase with the anomaly.

2. The motor controller according to claim 1, wherein, when the anomaly is detected, the calculating means calculates the d-axis electric current command value that changes in a monotonically nondecreasing manner or a monotonically nonincreasing manner in correspondence with the sign of the q-axis electric current command value with a predetermined rotation angle as an asymptotic line.

3. The motor controller according to claim 1, wherein, when the anomaly is detected, the calculating means calculates the d-axis electric value command value that changes along a tangential curve with a predetermined rotation angle as an asymptotic line.

4. The motor controller according to claim 1, wherein, when the anomaly is detected, the calculating means calculates the d-axis electric current command value in accordance with the phase with the anomaly, using the following expressions:

if the failure of electric current flow has occurred in the U phase:

$$I_d^* = I_q^* \times \tan\theta \qquad (1)$$

if the failure of electric current flow has occurred in the V phase:

$$I_d^* = I_q^* \times \tan\left(\theta - \frac{2\pi}{3}\right) \qquad (2)$$

if the failure of electric current flow has occurred in the W phase:

$$I_d^* = I_q^* \times \tan\left(\theta + \frac{2\pi}{3}\right) \qquad (3)$$

($\theta$: rotation angle, Id*: d-axis electric current command value, Iq*: q-axis electric current command value).

5. The motor controller according to claim 1, wherein the calculating means performs a guard procedure that restricts the d-axis electric current command value to a predetermined range.

6. The motor controller according to claim 1, wherein the signal output means detects the anomaly in any one of phases based on respective phase electric current values of the motor, a rotation angular velocity of the motor, and a duty command value of each of the phases.

7. The motor controller according to claim 6, wherein the signal output means determines that a failure of electric current flow has occurred in any one of the phases if the phase electric current value of the phase is smaller than or equal to a predetermined value, the rotation angular velocity of the phase is smaller than or equal to a predetermined value, and a duty command value of the phase is outside a predetermined range.

8. The motor controller according to claim 7, wherein the signal output means determines that a failure of electric current flow has occurred in any one of the phases if the phase is continuously maintained for a predetermined period or more in a state in which the phase electric current value of the phase is smaller than or equal to the predetermined value, the rotation angular velocity of the phase is smaller than or equal to the predetermined value, and the duty command value of the phase is outside the predetermined range.

9. The motor controller according to claim 7, wherein, the predetermined value of the phase electric current value is set to a value close to zero and the predetermined value of the rotation angular velocity is set to a value corresponding to a maximum number of rotation of the motor.

10. An electric power steering apparatus comprising the motor controller according to claim 1.

* * * * *